US008608065B2

(12) United States Patent
Wilson

(10) Patent No.: US 8,608,065 B2
(45) Date of Patent: *Dec. 17, 2013

(54) AUTHENTICATING ELECTRONIC FINANCIAL TRANSACTIONS

(71) Applicant: Lockstep Technologies Pty Ltd, Five Dock (AU)

(72) Inventor: Stephen Wilson, Five Dock (AU)

(73) Assignee: Lockstep Technologies Pty Ltd, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/646,142

(22) Filed: Oct. 5, 2012

(65) Prior Publication Data

US 2013/0031008 A1    Jan. 31, 2013

Related U.S. Application Data

(63) Continuation of application No. 12/937,700, filed as application No. PCT/AU2009/000456 on Apr. 14, 2009, now Pat. No. 8,286,865.

(30) Foreign Application Priority Data

Apr. 14, 2008  (AU) ................................ 2008901832
Dec. 8, 2008   (AU) ................................ 2008906336

(51) Int. Cl.
*G06K 5/00*      (2006.01)

(52) U.S. Cl.
USPC ......................................... 235/380; 235/382

(58) Field of Classification Search
USPC ................................................ 235/380, 382
See application file for complete search history.

(56) References Cited

U.S. PATENT DOCUMENTS

| 5,721,781 | A | 2/1998 | Deo et al. |
| 5,936,226 | A | 8/1999 | Aucsmith |
| 6,327,578 | B1 | 12/2001 | Linehan |
| 8,286,865 | B2 * | 10/2012 | Wilson .......................... 235/380 |
| 2006/0095771 | A1 | 5/2006 | Appenzeller et al. |

FOREIGN PATENT DOCUMENTS

WO    WO 2005/098630 A1    10/2005

OTHER PUBLICATIONS

International Search Report, dated Jun. 5, 2009, corresponding to PCT/AU2009/000456.

* cited by examiner

*Primary Examiner* — Kristy A Haupt
(74) *Attorney, Agent, or Firm* — Christie, Parker & Hale, LLP

(57) ABSTRACT

To improve security and simplify financial transactions in electronic communications environments, a cryptographic Private Key is securely stored in a storage device of a user. A Public Key Certificate corresponding to the Private Key is also created and can be stored in an online repository for merchant access. The Public Key Certificate identifies a payment card of the user, and is signed by or on behalf of a financial institution issuing the payment card. When initiating a payment card transaction with a merchant, a data item is signed using the Private Key. The signed data item and the Public Key Certificate are conveyed to the merchant, which enables the merchant to authenticate the transaction without needing to communicate with the user's financial institution, and while avoiding the inconvenience and privacy issues associated with obtaining other card details and user details.

13 Claims, 9 Drawing Sheets

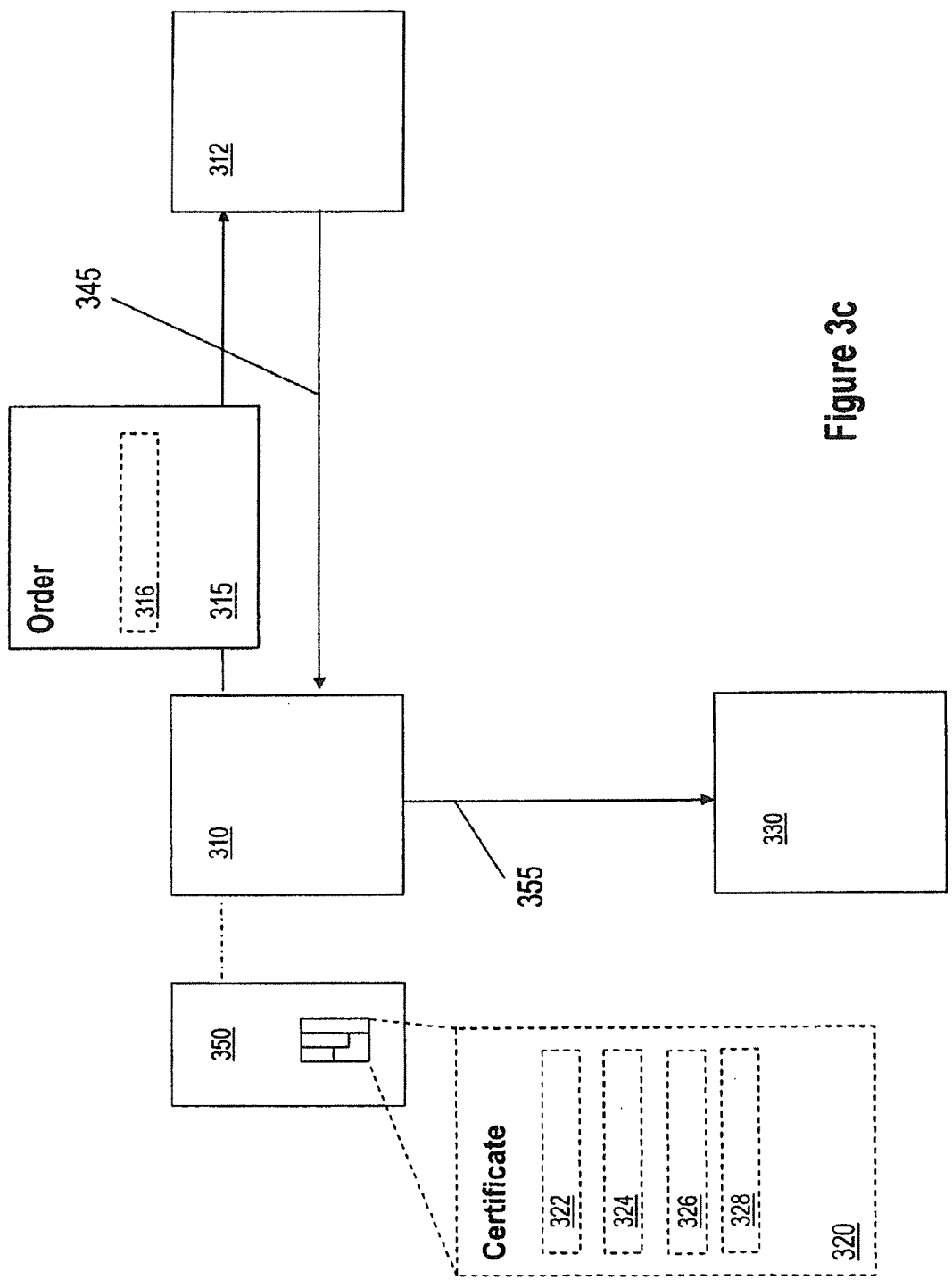

US 8,608,065 B2

AUTHENTICATING ELECTRONIC FINANCIAL TRANSACTIONS

CROSS-REFERENCE TO RELATED APPLICATIONS

This application is a continuation of U.S. patent application Ser. No. 12/937,700, filed on Oct. 13, 2010, which is a National Phase Patent Application and claims the priority of International Application Number PCT/AU2009/000456, filed on Apr. 14, 2009, which claims priority of Australian Patent Application Number 2008901832, filed on Apr. 14, 2008, and Australian Patent Application Number 2008906336, filed on Dec. 8, 2008.

TECHNICAL FIELD

The present invention relates to financial transactions in an electronic environment, such as card not present (CNP) credit card purchases, and in particular relates to improving the security of such transactions to reduce fraud.

BACKGROUND OF THE INVENTION

A major and growing form of fraud is the unauthorized use by one person of the payment card details of another person, in order to obtain goods or services without permission and using funds not their own. The payment cards affected include credit cards and debit cards, as well as "charge" cards and pre-paid gift cards. Originally, allowable "card not present" (CNP) transactions were devised to allow purchase of goods by mail order and by telephone order (collectively referred to as MOTO transactions). MOTO business rules and contemporary CNP transaction processing rules were developed to allow a merchant to charge a purchaser's credit card for goods or services delivered, even when the merchant does not sight the purchaser's credit card, nor the act of the cardholder signing the purchase order, nor the cardholder's signature itself in the case of telephone transactions.

In general terms, a CNP transaction can be originated by simply quoting payment card details such as the card number, the cardholder name as it appears on the card, and the card expiry date. CNP transactions have always been relatively more vulnerable to fraud than regular "card present" transactions. For many years, attempts to create fraudulent CNP transactions have centered on gaining illicit access to the necessary payment card details, most of which could be found on card statements, or on the carbon paper waste generated when recording card details through a traditional imprinter. The slang term "dumpster diving" was coined to reflect that way that fraudsters could obtain all information needed to effect false CNP transactions by looking through trash, especially in the dumpsters outside busy stores.

To combat CNP fraud, financial institutions have steadily introduced additional pieces of information that must be provided by the legitimate card holder to initiate CNP transactions, but which are harder for criminals to obtain. Chief amongst the additional pieces of information was the credit card verification (CCV) code. This is an extra number typically of three or four digits that is printed on a credit card but not embossed (as is the traditional 15 or 16 digit card account number). Because the CCV is not embossed it is not copied onto carbon paper by a card imprinter. The CCV has proven to be an effective security tool for telephone orders, because when a card holder verbally quotes their CCV to a telephone operator for entry into a verification system no trace of the CCV remains for a criminal to obtain, provided that the operator is acting honestly.

To further combat CNP fraud, financial institutions also arranged for merchant terminal receipts to not display all cardholder details, making the trash less valuable to fraudsters.

In Internet based e-commerce, the CNP rules initially proved to be useful and helped to foster an explosion in the use by consumers of transactions over the Internet, referred to as web transactions. All parties benefited from the ease of use of credit cards in web transactions supported by the CNP rules. Cardholders enjoyed the convenience of web transactions, merchants saw higher sales and many were able to develop entirely new "virtual" commerce models unencumbered by physical shop fronts, and financial institutions enjoyed higher transaction volumes and interest returns.

However, web commerce has nevertheless inadvertently led to new ways for criminals to perpetrate CNP fraud and has furnished criminals with new sources of payment card details, thus overturning most if not all previous CNP fraud prevention strategies. In particular, vast aggregations of payment card details and other personal information records are now generated as a matter of course by merchants, and by financial system intermediaries involved in processing payment card transactions. Cyber criminals now have access to stolen payment card details on a massive scale, either by directly invading and copying databases that have not been adequately secured, or by obtaining details from other criminal enterprises that have grown up around CNP and other fraud opportunities and now trade stolen personal details.

Web commerce also exacerbates the problem by making it vastly easier for criminals to launch automated illegitimate payment card transactions in great numbers. Online merchant sites may be vulnerable to attack by computers which are able to automatically replay stolen card details. Merchant web commerce servers are unable to discern whether a stream of alphanumeric data has been legitimately produced by the card holder or has been produced from stolen personal details. The fundamental vulnerability of current web commerce systems to CNP fraud relates to the fact that, on the face of it, nothing indicates to a merchant server that the alphanumerical payment card data transmitted over the network has come from a legitimate user or not Inherently insecure communications channels such as the Internet (and to some extent the telephone network too) do not provide built-in mechanisms by which the legitimacy of a set of payment card details can be assured.

Another salient aspect of current electronic transactions is that financial institutions such as banks use a variety of non-public key methods (classically two-factor authentication) to safeguard their own internet banking services against fraud. The banks' deployment of two factor authentication has made it more difficult for criminals to 'hack' into bank accounts directly; that is, to gain illicit access and thence transfer funds to the attacker's accounts. However, these two factor authentication methods are only efficient in 'closed' systems, also known as hub and spoke systems, in which the individual must prove their bona fides to the financial institution itself. Two factor authentication is significantly more complicated to manage in open systems, where the relying party (the merchant) is not the issuer of the two factor token. It is a substantial challenge in web commerce to offer merchants accepting card-not-present transactions protection against fraud, as the banks' two factor internet banking security mechanisms do not extend to or scale up to many millions of merchants.

The acceleration in online CNP fraud is due in part to the preceding factors. Further, the deployment of Chip-and-PIN (smartcards) for combating card present fraud has been effective in reducing opportunities for criminals to skim traditional magnetic stripe payment card details and to counterfeit fake cards, making CNP fraud a more appealing target for criminals. Finance industry authorities report that globally over the past four years the industry has experienced a 50 to 100% increase in gross credit card fraud, predominantly relating to CNP fraud, leading to worldwide losses of many billions of dollars. CNP fraud is now the most prevalent form of credit card fraud in many jurisdictions.

A common response of financial institutions to CNP fraud is to require merchants to gather and scrutinize increasingly detailed ancillary private information about card holders in an effort to establish the customer's legitimacy. One set of merchant guidelines recommends obtaining card issue number, card start date, contact phone number, the name of the issuer, the CCV number and the cardholder's statement address. However collecting such data intrudes on card holder privacy, consumes significant time for customer and merchant alike, and adds to the compliance burden of merchants who must provide special systems to safeguard such personal data. These details are not otherwise required for a payment card transaction, and collecting such details exposes the customer to identity theft and in turn dilutes the effectiveness of such data for proving legitimacy.

Another response to CNP fraud is to monitor transactions for subsequent investigation, but without actually preventing completion of the transaction at the time. This type of response leads to significant direct financial losses, in addition to indirect costs relating to inconvenience, investigation, dispute resolution, and lost business due to falling confidence. Currently financial institutions usually extend refunds to card holders whose details are used fraudulently by others, and to merchants if they have been defrauded. The overall cost worldwide amounts to hundreds of millions of dollars annually, and it is rising exponentially.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY OF THE INVENTION

According to a first aspect the present invention provides a method for securing a financial transaction in an electronic communications environment, the method comprising:
securely storing in a storage device of a user a cryptographic Private Key; and
creating a Public Key Certificate corresponding to said Private Key, the Public Key Certificate identifying a payment card of the user, and the Public Key Certificate being signed by or on behalf of a financial institution issuing the payment card;
whereby at a time of initiating a payment card transaction with a merchant, a data item may be signed using the Private Key, and the signed data item and the Public Key Certificate may be conveyed to the merchant.

According to a second aspect the present invention provides a payment card for effecting secure financial transactions in an electronic communications environment, the payment card comprising:
a tamper resistant storage device securely storing a cryptographic Private Key;
wherein at a time of using the payment card to effect a transaction with a merchant, the Private Key can be used to sign a data item and the signed data item can be conveyed to the merchant, and whereby the merchant can use a Public Key Certificate corresponding to said Private Key to authenticate the signed data item, the Public Key Certificate identifying the payment card and being signed by or on behalf of a financial institution issuing the payment card.

According to a third aspect the present invention provides a client application for effecting secure financial transactions in an electronic communications environment, the client application comprising:
code for effecting communication with a merchant via the electronic communications environment in relation to a transaction;
code for causing a Private Key associated with a payment card of a user to sign a data item;
code for causing the signed data item to be conveyed to the merchant to effect the transaction, whereby the merchant can use a Public Key Certificate corresponding to said Private Key to authenticate the signed data item, the Public Key Certificate identifying the payment card and being signed by or on behalf of a financial institution issuing the payment card.

The client application may comprise a web browser application.

According to a fourth aspect the present invention provides a computer program element comprising computer program code means to make a customer computer execute a procedure for effecting secure financial transactions in an electronic communications environment, the computer program element comprising:
computer program code means for effecting communication with a merchant via the electronic communications environment in relation to a transaction;
computer program code means for causing a Private Key associated with a payment card of a user to sign a data item;
computer program code means for causing the signed data item to be conveyed to the merchant to effect the transaction, whereby the merchant can use a Public Key Certificate corresponding to said Private Key to authenticate the signed data item, the Public Key Certificate identifying the payment card and being signed by or on behalf of a financial institution issuing the payment card.

According to a fifth aspect the present invention provides a merchant application for effecting secure financial transactions in an electronic communications environment, the merchant application comprising:
code for effecting communication with a customer via the electronic communications environment in relation to a transaction;
code for receiving a Public Key Certificate identifying the payment card of the customer, and for authenticating that the Public Key Certificate has been signed by or on behalf of an issuing financial institution; and
code for using a Public Key contained in the Public Key Certificate to authenticate that a signed data item was signed by a Private Key associated with the payment card, and for making completion of the transaction conditional upon such authentication.

According to a sixth aspect the present invention provides a computer program element comprising computer program code means to make a merchant computer execute a procedure for effecting secure financial transactions in an electronic communications environment, the computer program element comprising:

computer program code means for effecting communication with a customer via the electronic communications environment in relation to a transaction;

computer program code means for receiving a Public Key Certificate identifying the payment card of the customer, and for authenticating that the Public Key Certificate has been signed by or on behalf of an issuing financial institution; and computer program code means for using a Public Key contained in the Public Key Certificate to authenticate that a signed data item was signed by a Private Key associated with the payment card, and for making completion of the transaction conditional upon such authentication.

In a preferred embodiment of the invention, the storage device of the user is a tamper resistant storage device resistant to copying of the Private Key.

In a preferred embodiment of the invention, the storage device is integral with the payment card. For example the storage device may comprise the chip of a smartcard serving as the payment card. Optionally, the storage device may be separate to the payment card and may for instance comprise a mobile (cellular) telephone subscriber identification module (SIM) card.

In these or other embodiments of the invention, the storage device may possess cryptographic computing power to effect signing using the Private Key, and is preferably configured such that the Private Key does not leave the confines of the storage device.

The client application is preferably configured to require interfacing of the storage device at the time of each such transaction, in order to require that the user demonstrate possession of the Private Key.

In preferred embodiments of the invention the Public Key Certificate identifies the payment card by including the payment card number, such as a credit card number. In such embodiments the payment card number is preferably conveyed to the merchant only as part of the Public Key Certificate and the card number need not be communicated in raw alphanumeric form as occurs in existing CNP transactions.

The data item signed by the Private Key preferably comprises or consists of a transaction-specific message. Transaction specificity of the data item provides strong resistance of the signed data item to replay attack. The transaction specific message may comprise data setting out the goods and/or services that are the subject of the transaction, the date and/or the price. Alternatively the transaction specific message may comprise any suitable challenge such as a transaction-specific random data string provided by the merchant application. The format of the data item may be pre-defined such that both the client application and merchant application are configured to utilize the same data item format for each transaction. Alternatively the data item format may be alterable from one transaction to the next, such embodiments being possible due to the original data item being visible to the merchant application in the signed data item alongside the cryptographic hash (or signature) generated by the user's Private Key.

The Public Key Certificate may be stored in the tamper resistant storage device together with the Private Key, or may be stored in any other suitable storage device accessible to the merchant, such as an online central repository.

Notably, preferred embodiments of the present invention provide for the user's possession of the Private Key associated with the payment card to be authenticated at the time of each and every transaction, without need for the merchant to obtain such authentication from the financial institution which issued the payment card. This is of importance to financial institutions and merchants alike which would prefer not to require the overhead and complexity involved in connecting millions of merchants to a back-end system providing such authentication functionality.

Preferably, the storage device is protected by a personal identification number (PIN).

In preferred embodiments, the Public Key Certificate of a payment card reported lost or stolen is revoked, and the card's status is recorded as such in a Certificate Revocation List or similar Certificate status system. Merchant applications may then access revocation status via the Online Certificate Status Protocol (OCSP) or similar mechanism. Such embodiments enable merchants to determine whether a used payment card had been cancelled using a simple, fast and secure system, and without requiring the merchant to make contact with the issuing financial institution.

In embodiments where the payment card possesses the ability to self-monitor a payment limit, the Public Key Certificate preferably further includes information indicating that the card possesses such capability. In such embodiments, the merchant server can become aware of such cards, and thereby obtain in an automated manner and without connecting to a backend payments system improved confidence that a used card is not over limit.

The Public Key Certificate may include further attributes such as the payment card holder's name in embodiments where this is deemed to be required, perhaps for reasons of redundancy, legacy system integration, or the possibility that merchants want to know the name and address of customers for other reasons. In preferred embodiments, minimal information beyond the payment card number is included in the Public Key Certificate for privacy reasons.

Upon authentication of the transaction in accordance with the present invention, the merchant may then utilize regular CNP transaction instructions to effect settlement with the relevant issuing financial institution. An advantage of such embodiments of the present invention is thus in preserving many of the existing arrangements and computer systems put in place between merchants and financial institutions for processing CNP transactions, while improving the means for merchants to verify the bona fides of payment card details received from customers online.

The electronic communications environment may be the Internet, telephone network or other network, whether wireless or wired.

BRIEF DESCRIPTION OF THE DRAWINGS

An example of the invention will now be described with reference to the accompanying drawings, in which:

FIG. 3c is a schematic illustrating an improved online CNP payment protocol in accordance with a further embodiment of the invention;

DESCRIPTION OF THE PREFERRED EMBODIMENTS

Figure 1:
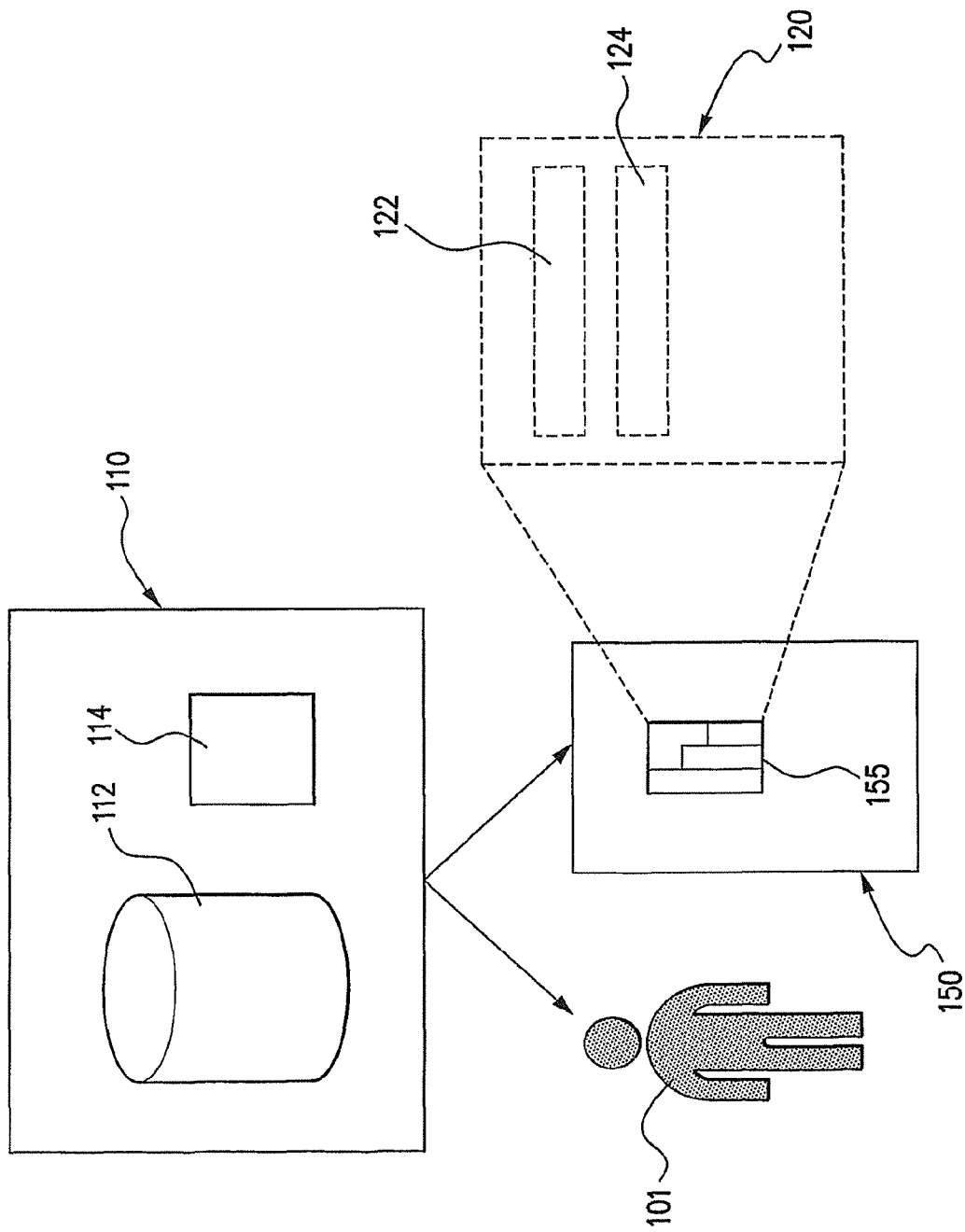
FIG. 1 is a schematic illustrating issuance of a payment card in accordance with the present invention.

With reference to FIG. 1, a financial institution 110 maintains a database 112 of customer payment card details. The financial institution 110 issues to a payment card holder 101 listed in the database 112 a payment card 150. In this embodiment the payment card 150 comprises a smartcard including a processor chip 155 having secure tamper resistant storage and cryptographic processing capability. During the process of personalizing and issuing the payment card 150, the processor chip 155 generates a Public Key-Private Key pair. A Public Key Certificate 120 corresponding to said Public Key-Private Key pair is created and signed by a Certification Authority 114 operated by the financial institution 110. In alternative embodiments the Certification Authority may be a separate party engaged by the financial institution for this purpose. The Public Key Certificate 120 includes the payment card number 122, thus identifying the payment card. The Public Key Certificate 120 also includes a digital signature 124 of the financial institution 110. In alternative embodiments the digital signature 124 is created by a separate Certification Authority on behalf of the financial institution. In order to create this type of certificate, special authority is required to order the creation by Certification Authority 114 of the Public Key Certificate 120. Notably, therefore, only an internal bank system operated by an authorized bank worker will be able to create this type of certificate, providing very substantial security.

Figure 2:
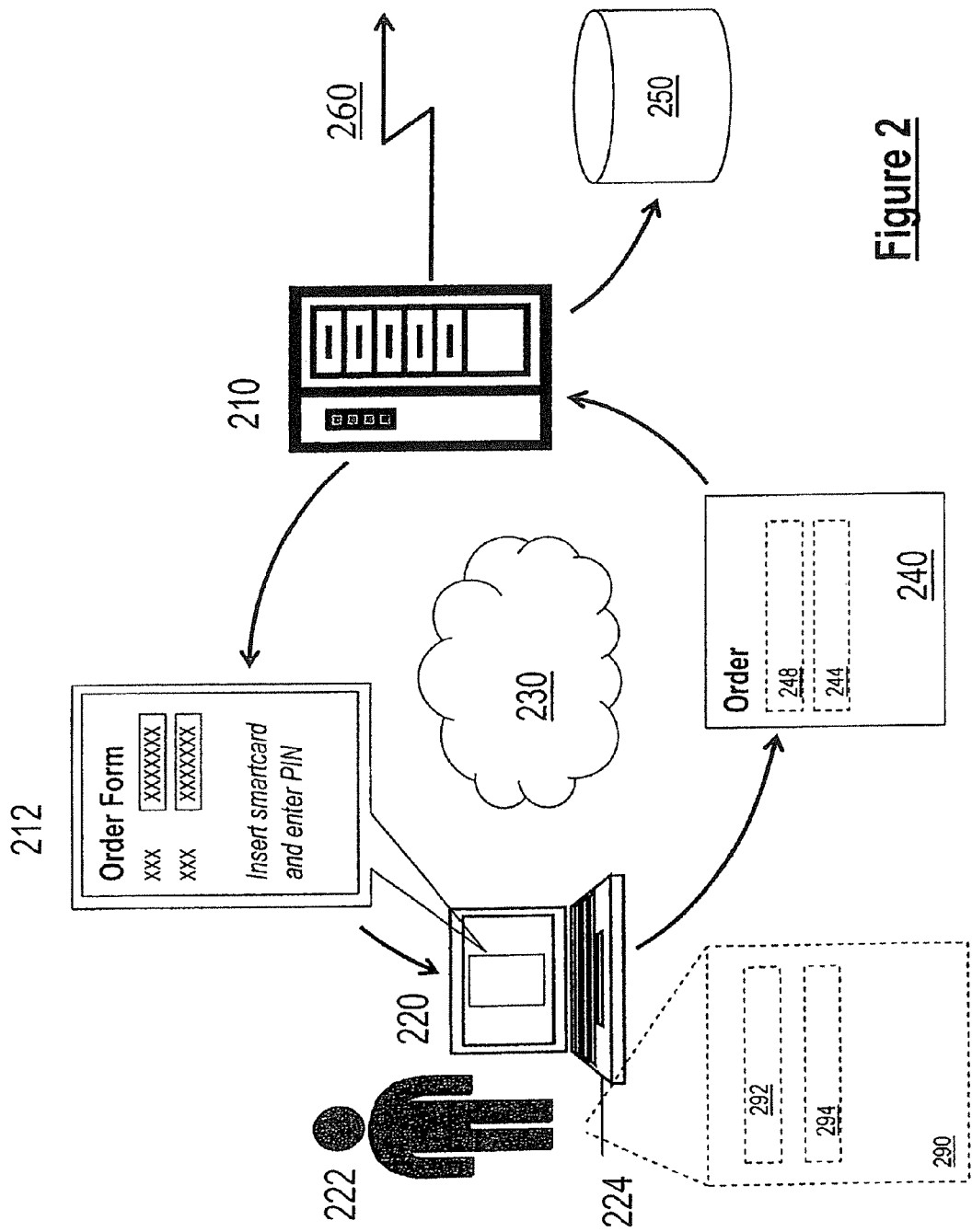
FIG. 2 is a schematic illustrating a system for secure financial transactions over the Internet.

FIG. 2 illustrates such use of the payment card to effect an online transaction via the Internet.

At step 1 the merchant server 210 serves an e-commerce form such as order form 212 to the personal computer 220 of a user 222 via the Internet 230. Notably, in this embodiment to effect the e-commerce transaction does not require the customer to enter any extraneous personal details, only the details of their particular order. There is no need to obtain the card holder's card verification code, the card holder's billing address or anything else that is conventionally used to substantiate a card-not-present transaction.

At step 2, the user 222 must simply insert the card 224 into a smartcard reader of the personal computer 220. The user must further type their PIN to authorize the processor chip to generate a digital signature 244 using the Private Key to thus effect the transaction in the following Step 3.

At step 3, the user's response to the e-commerce form 212 causes a Private Key securely stored in the tamper resistant storage of the smartcard 224 to sign transaction details and convey the signed details 240 and the Public Key Certificate 290 stored on the card 224 back to the merchant server 210.

Note that the Public Key Certificate 290 indicates not only the payment card number 292 but also identifies the issuing bank and identifies the precise type of smartcard in use; these additional pieces of information may be used by the merchant server 210 to effect certain business rules when it processes the transaction. Furthermore, in alternative embodiments additional details of the card holder may be conveyed in Public Key Certificate 290 such as, without limitation, the expiry date of the payment card. Such additional details are in effect notarized by being included in the Public Key Certificate and may therefore be relied upon by existing business processes carried out between the merchant and financial institutions to effect payment settlement.

At step 4 the merchant server 210 uses the user's Public Key from the Public Key Certificate 290 to verify that the digital signature 244 on the transaction 240 is cryptographically valid and that the transaction 240 has been received intact. In keeping with Public Key Infrastructure methods, the merchant server 210 will also use a copy of a Root Key Certificate (not shown in the figure) to validate the signature 294 of the issuer on the user's Public Key Certificate 290. If the user's digital signature 244 is so verified, then the merchant server 210 is able to deduce that the payment card 224 must have been in the possession of the user 222 at the time of that transaction. Further, the merchant server 210 is able to deduce that the payment card number 292 must be valid because, as noted above, it is not possible for the user's Public Key Certificate 290 containing the payment card number to have been created in any way other than by an internal bank system operated by an authorized bank worker. Note that such functionality to verify digital signatures and Public Key Certificates can be effected using standards-based software running on the merchant server 210, which can thereby validate the transaction carried out using the current invention without recourse to the issuing bank, nor any clearing house or authentication server. All that is required is a copy of the Root Public Key of the Public Key Infrastructure in which the issuing bank's Certificate Authority operates. Said Root Public Key can be readily installed with the merchant web commerce software. In alternative embodiments, the bank's Certificate Authority can be a member of an overarching commercial PKI, the Root Public Key of which may be built in to the commercial merchant server products and will automatically be available for the purposes of verifying digital signatures received from payment card holders.

At step 5, the merchant server 210 checks whether the payment card number 292 has been deactivated and placed on a blacklist server 250, to guard against misuse of a stolen card. In this embodiment the blacklist server 250 is hosted by a PKI service provider and is available over the Internet using standard protocols such as Online Certificate Status Protocol.

Subject to appropriate outcomes of the above steps the transaction can be concluded, and the merchant provides the desired goods/services to the user and at step 6 sends the usual card-not-present instructions 260 to the bank in question to arrange settlement.

Consequently, the transaction can be validated by any e-commerce server, without the need for a special card scheme authentication server, unlike existing online payment schemes. Moreover, the present embodiment provides improved security of such transactions without any change to the interface between the merchant server and the acquiring bank's payment systems. That is, the present invention can be implemented to re-use the existing CNP payment processing infrastructure and business arrangements.

By providing Public Key Certificate 120 associated with the payment card 150, the present invention confers legitimacy to payment card details and similar personal information sent over an insecure network such as the Internet. This embodiment of the invention uses cryptographic functions in certain types of smart payment cards (also referred to as "Chip and PIN" cards) to generate unique digital signature codes each time the payment card number is presented via the Internet. Each unique digital signature shows that the presentation was made using a legitimate card, and cannot have been made any other way.

Instead of the payment card details being presented as simple alphanumerical data, the present invention provides for the payment card details to be contained in a tamper resistant Public Key Certificate associated with a Public Key—Private Key pair unique to the smart payment card 150. A fresh Public-Private Key pair is used for each payment card number. To submit a payment card number on line, the Public Key Certificate is presented, not the raw alphanumeric payment card details. Furthermore, to evince possession of the payment card in question, the transaction involves signing authenticating data using the Private Key associated with the Public Key Certificate, and sending the signature code together with the Public Key Certificate to the merchant server.

In a preferred embodiment, the payment card details are irrevocably bound to a specific commerce transaction by producing a digital signature based on the transaction data using the unique Private Key that matches the Public Key Certificate. Therefore the receiver of the transaction, after successfully verifying the digital signature using PKI processing software, can be assured that the transaction was initiated by someone in control of the payment card that corresponds to the unique Private Key value. In particular, it is not feasible for a "replay attack" to be mounted against the payment card number, because it is not possible for an attacker to synthesize the signature code for any other transaction if they do not have control of the Private Key.

In this preferred embodiment, the smart payment card is protected by PIN, so that if the card falls into the wrong hands, it is unlikely to be usable. This measure reinforces the desired ability for the receiver to gain assurance of the legitimacy of a transaction by merely being able to verify the digital signature on a card-not-present transaction against the Public Key Certificate holding the payment card details.

This embodiment of the invention thus provides the advantage that payment card details can be verified as being true and correct, and that they have been presented afresh with the cardholder's consent. Moreover, such verification is made possible while still using standard Public Key Certificate parsing and digital signature processing techniques. Also, the certificate parsing and signature processing can be achieved by the merchant's e-commerce server without having to defer to a backend payments processing system.

If it is desired that the validity of the payment card be checked before processing the transaction, in order to check for example if the payment card has been reported as lost or stolen, this check can be performed in a straightforward manner by the Online Certificate Status Protocol or similar technique. Here the merchant server 210 need not connect to the payments system or financial institution but instead connects with the Certificate Authority that manages the certificates on behalf of the card issuer. The Online Certificate Status Protocol check is relatively efficient and fast, and is available as an automatic function in many e-commerce server platforms. It has the further advantage of not revealing any details about the transaction to anyone apart from the merchant and the card holder.

Because there is no change to the conventional integration with back end payment systems, the invention is relatively straightforward to implement at the merchant server. It fundamentally preserves existing CNP transaction processing interfaces between merchants and banks. This embodiment of the invention further enables significant reduction in the quantity and sensitivity of personal information divulged by a payment card holder to a merchant in order to substantiate their right to use a payment card. This protects card holder privacy and in the longer term will reduce the overall level of personal information aggregated at different points in payments systems where it currently is vulnerable to concerted attacks by cyber criminals and identity thieves. It also eases the burden on merchants to appropriately handle and safeguard personal details that are not otherwise needed for their business.

In traditional credit card processing systems, it has been important for the merchant system to connect to the backend payments system in order to be able to verify that the card holder credit limit has not been breached. However, the present invention enables merchants to exploit the ability of certain smart credit cards to automatically monitor spending patterns and detect when the credit limit has been reached, without deferring to a backend system. Embodiments of the present invention may exploit such credit cards by providing for the digital Public Key Certificate of the credit card to further contain data that indicates that the card containing the matching private key is also of the type that automatically checks credit limit. This indication will thus be conveyed to the merchant when the card holder uses their smartcard and the Public Key Certificate to submit their credit card details. The merchant server is able to detect such indicating data and to thereby be better assured that the credit card holder is not likely to be over limit.

It is further notable that the present embodiment provides for what might be thought of as digital notarization of the fact that the cardholder is the legitimate owner of a certain payment card number, as effected by the Public Key Certificate. Moreover, this embodiment provides for such notarization to be performed by the issuing bank as part of the personalization process for their own smart payment cards. This means that the body in the best position to notarize ownership of a card number is indeed carrying out the certificate issuance.

The present embodiment thus utilizes the smart payment card as a security device for combating online CNP fraud. A benefit of this is that this embodiment improves the return on investment of smartcards by using them for both card present and card not present transactions.

Moreover, the transaction processing steps are simple and yet inform the merchant that: the payment card number is genuine and has not been made up by an attacker; the number has been presented afresh with the cardholder's consent, and has not been replayed by an impostor; and the payment card details have been safeguarded by a genuine smartcard.

The present embodiment of the invention thus provides cardholders with better protection of their privacy, with reduced demand to disclose extraneous personal details in routine e-commerce. Cardholders further are provided with a simpler, faster, ATM-like online shopping experience.

The present embodiment of the invention provides merchants with reduced vulnerabilities to CNP fraud over the Internet, and with a uniquely strong assurance that payment card details received online are genuine. Merchants benefit from a simple, low cost implementation, with no change to the merchant interface to acquiring banks for CNP transactions as all such processing occurs in the merchant server software. Merchants further benefit from only needing to gather the information needed for their business, with less need for aggregation of irrelevant customer details, reduced exposure to ID theft, reduced risk, and easier compliance with formal security obligations such as those laid down by the Payment Card Industry.

Banks and financial institutions also benefit from reduced losses from CNP fraud, enhanced return on investment on Chip & PIN cards, and easier implementation than any other online payment scheme due to no authentication server being required.

The preceding embodiment provides for online merchants to validate payment card details without connecting to an additional authentication server nor to the institution that issued the payment card.

There exists an online CNP payment protocol where CNP fraud is mitigated by creating a real time connection between the payment card issuer and the purported card holder in which the card issuer confirms the card holder by such means as a secret password or a challenge-response handshake. In such a protocol, the merchant server re-directs the card holder's web browser to another server controlled by the card issuer so that the card issuer can take on responsibility for authenticating the purported card holder. For instance, the card holder might be prompted via a pop-up dialogue box or an inline window to enter a password or enter a numerical response code generated by a personal authentication device. The card issuer automatically verifies the password or other response in real time before sending an indication back to the merchant server as to the customer's authenticity. In such online CNP payment protocols, it is typically the case that the card issuer selects an authentication mechanism for implementation which is independent of the payment card scheme. Such an online CNP payment protocol can typically accommodate a number of alternative general authentication mechanisms at the discretion of the issuing institution.

Figure 3A:
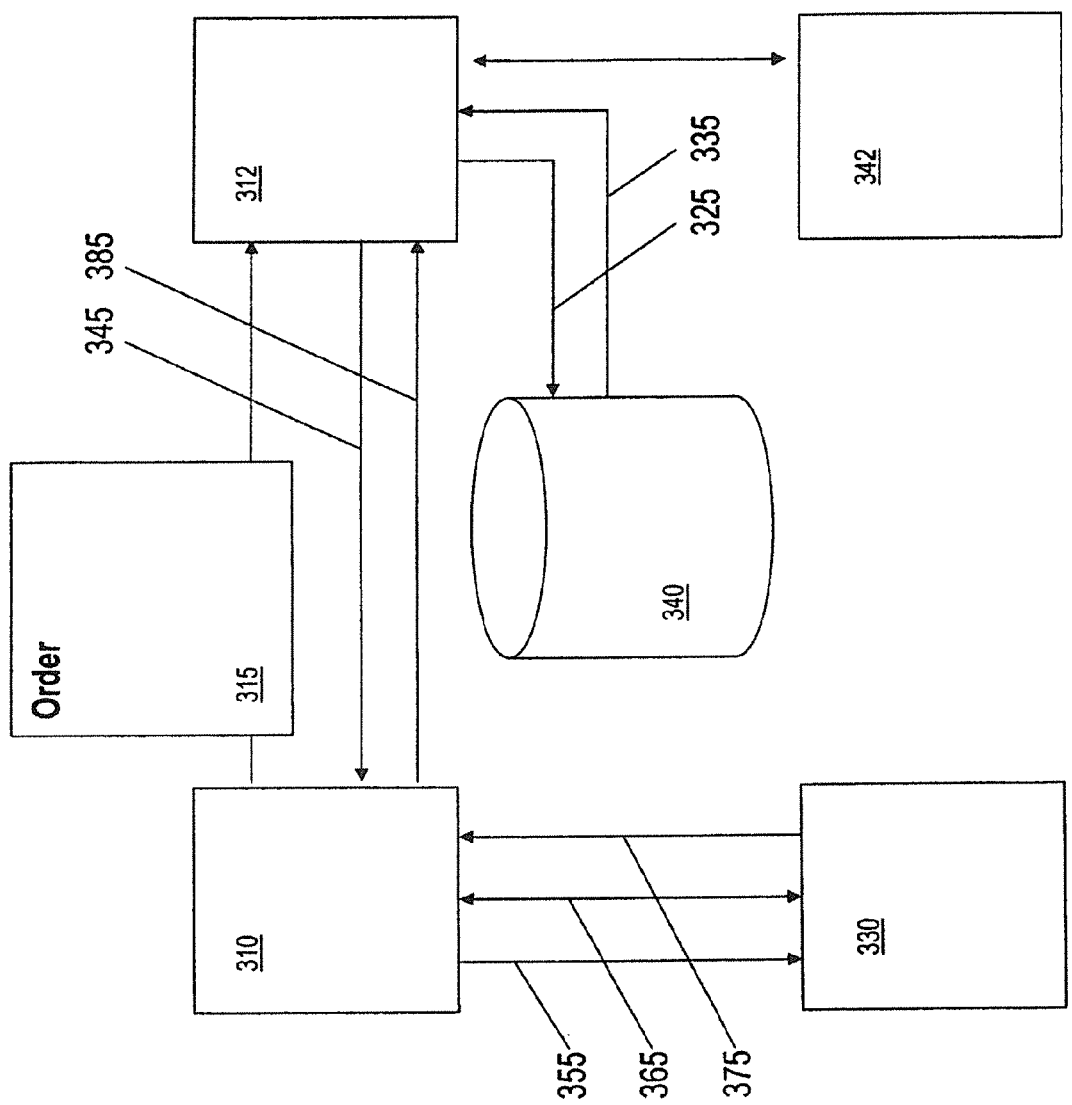
FIG. 3a is a schematic illustrating an existing online CNP payment protocol.

Referring to FIG. 3a, which illustrates operation of an existing current online CNP payment protocol, the payment card holder establishes a connection from their web browser 310 to a merchant server 312 and decides upon a purchase the details of which are contained in order form 315. The card holder indicates to the merchant that they wish to pay for the order using a particular online CNP payment protocol. The merchant must determine the online location of the card issuer server 330, because the authentication of the card holder under the online CNP payment scheme is carried out by the card issuer before the merchant ultimately accepts of rejects the order. The merchant server 312 refers at step 325 to an online directory 340 to look up the address of the card issuer server 330. Said address may be a Universal Resource Locator (URL), or an Internet Protocol (IP) address, or any other suitable address depending on the detailed design of the payments system. The directory 340 may be operated by the payment card scheme independent of both the card issuer 330 and the merchant's acquiring bank 342.

At this stage the merchant server can also confirm the customer's status in the given online CNP payment scheme. The address of the card issuer server and other information such as the card holder's status are returned at step 335 to the merchant server 312. Card holder browser 310 is then redirected by merchant server 312 at steps 345 and 355 to the card issuer server 330. Card issuer server 312 subsequently initiates an authentication handshake 365 directly with the card holder. The detailed mechanism deployed in handshake 365 is selected by the card issuer, and may or may not use a smartcard. The result of handshake is communicated at steps 375 and 385 back to the merchant server 312, which then either accepts or rejects the customer transaction.

In practice, a customer of an issuing bank in possession of a payment card issued by that bank may or may not also participate in an online CNP payment card scheme overseen by a card association with which the issuing bank is affiliated. Participation by the cardholder in an online CNP payment card scheme can entail additional enrolment steps carried out either before or after issuance of the payment card. In an instance where the merchant server needs to determine whether the customer is properly enrolled in a given online CNP payment card scheme the merchant server 312 typically refers to an online directory such as 340 in order to look up the customer status in a particular payment card scheme.

Figure 3B:
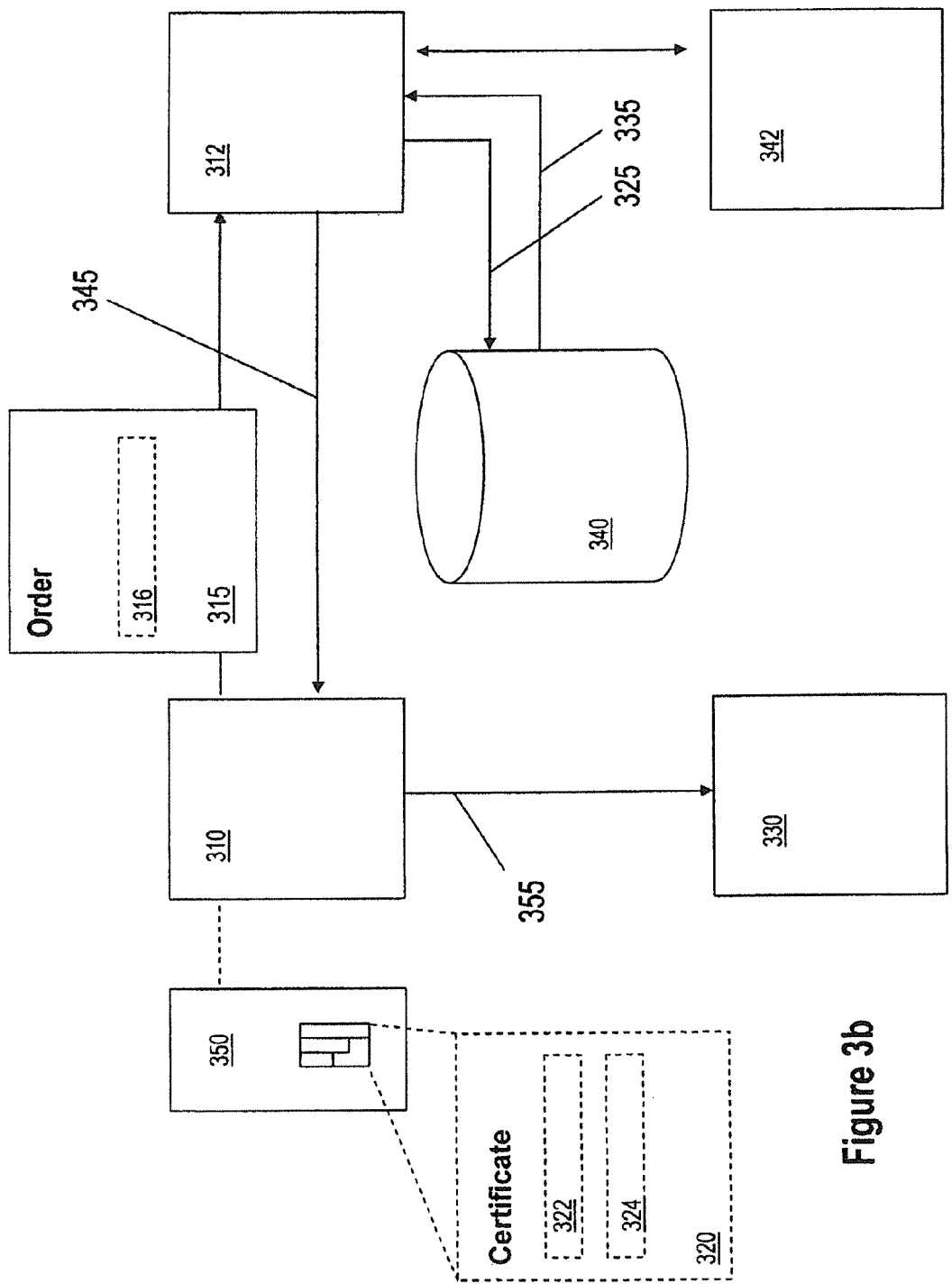
FIG. 3b is a schematic illustrating an improved online CNP payment protocol in accordance with an embodiment of the invention.

FIG. 3b illustrates a further embodiment of the present invention. In accordance with this embodiment, the card holder uses their web browser 310 and smartcard 350 to digitally sign the order 315 sent to merchant server 312. The private key used to create the digital signature 316 is stored securely within smartcard 350 and corresponds to a public key certificate 320. The public key certificate 320 contains a copy of the card holder's payment card details 322 and is digitally signed 324 by the card issuer. The act of verifying digital signature 316 on order form 315 using public key certificate 320 indicates to the merchant server 312 with a high degree of certainty that the order originated from someone in control of smartcard 350 which in turn corresponds uniquely to payment card details 322. That is, the merchant server 312 can be confident that the customer is the legitimate card holder.

When the merchant server 312 re-directs the customer browser 310 to the card issuer server 330, an electronic message (not shown) is included in communications 345 and 355 indicating that the merchant server 312 has already confirmed the digital signature 316 and the public key certificate 320. Standard online CNP payment protocols can include within their messaging specifications the ability for merchant server 312 and card issuer server to exchange extra messages with a meaning determined by prior arrangement. Said ability can be used to convey said electronic message indicating that the merchant server has already confirmed the digital signature 316 and the public key certificate 320. (Alternatively, in communications 345 and 355 the merchant server 312 can forward a copy of the digital signature 316 and the public key certificate 320 to the card issuer so that the card issuer may check for itself that the digital signature corresponds to the public key certificate). Informing the card issuer server 330 that the public key certificate 320 has already been verified alleviates the card issuer from needing to undertake an authentication handshake. The card issuer may simply check the revocation status of public key certificate 320 in order to protect against abuse of a lost or stolen payment card. It is envisaged that the public key certificate 320 will be signed by the card issuer, thus facilitating the processes of verifying the digital signature 316 and checking the certificate's revocation status.

In accordance with this embodiment, obviating the need for the handshake 365 (FIG. 3a) significantly streamlines the approach without compromising security of the online CNP payment protocol.

This embodiment of the invention further provides the advantage that the process is conducted with overall greater speed and efficiency. Re-direction from the merchant server to the card issuer's server, which is time consuming and slows down the overall payment processing, is no longer required. Furthermore, the present invention when applied in this way to an existing online CNP payment protocol does away with the unorthodox pop-up dialogue box or inline window used by the card issuer to authenticate the card holder. Such a feature can give the undesirable impression to the customer of a phishing attack or other untoward activity.

Referring to FIG. 3c, an embodiment of the present invention provides the means for the merchant server 312 to locate the card issuer server 330 without referring to any directory. Included in public key certificate 320 is a first data field 328 that carries an indication of whether or not the cardholder participates in a given payment card scheme and an additional data field 326 that (assuming the data field 328 is occupied) carries said address. Thus merchant server 312 when it carries out the verification of digital signature 316 using public key certificate 320 will obtain at the same time a tamper resistant copy of the card issuer server address in data item 326. Said copy of the address is highly reliable and verifiable by standard digital signature processing software. Merchant server 312 is then able to redirect card holder browser 310 at steps 345 and 355 using said address and without needing to refer to any directory to obtain the address. If the digital signature 316 on the order 315 is verified by merchant server software against the public key certificate 320, then the merchant can be highly confident that all details conveyed in the public key certificate 320 hold true for the card holder in possession of smartcard 350. This approach to obtaining details about a customer and their online CNP payment scheme results in a significant streamlining of the re-direction process from browser to card issuer, and also simplifies the task of integrating the merchant server 312 software into the online CNP payments scheme.

In optional embodiments, the address of the card issuer server 330 is included in a data field of an additional public key certificate (not shown) separate from the public key certificate 320 which carries the card holder details 322. Using a separate digital certificate is advantageous if the address of the card issuer server is liable to change in a shorter time period than the lifetime of the cardholder public key certificate 320. Note that if the card issuer server has multiple addresses, or if there are multiple card issuer servers, such that the merchant server 312 needs to select one address from many valid alternatives, then the present invention allows for multiple additional public key certificates to be issued to smartcard 350, where each such certificate contains a separate issuer server address and corresponds to a private key stored securely in smartcard 350.

In a further embodiment, the status of the card holder in a payment card scheme is indicated in an additional public key certificate (not shown) separate from that public key certificate 320 which carries the card holder details 322. Using a separate digital certificate is advantageous if the cardholder enrolls in the payment card scheme some time after the payment card 350 and public key certificate 320 are issued.

This embodiment of the invention further provides the advantage of decreasing the cost and complexity of the merchant's e-commerce infrastructure. Elimination the lookup step also removes the requirement for an extra computer sub-system that would otherwise need to be integrated with the merchant server.

Figure 4:
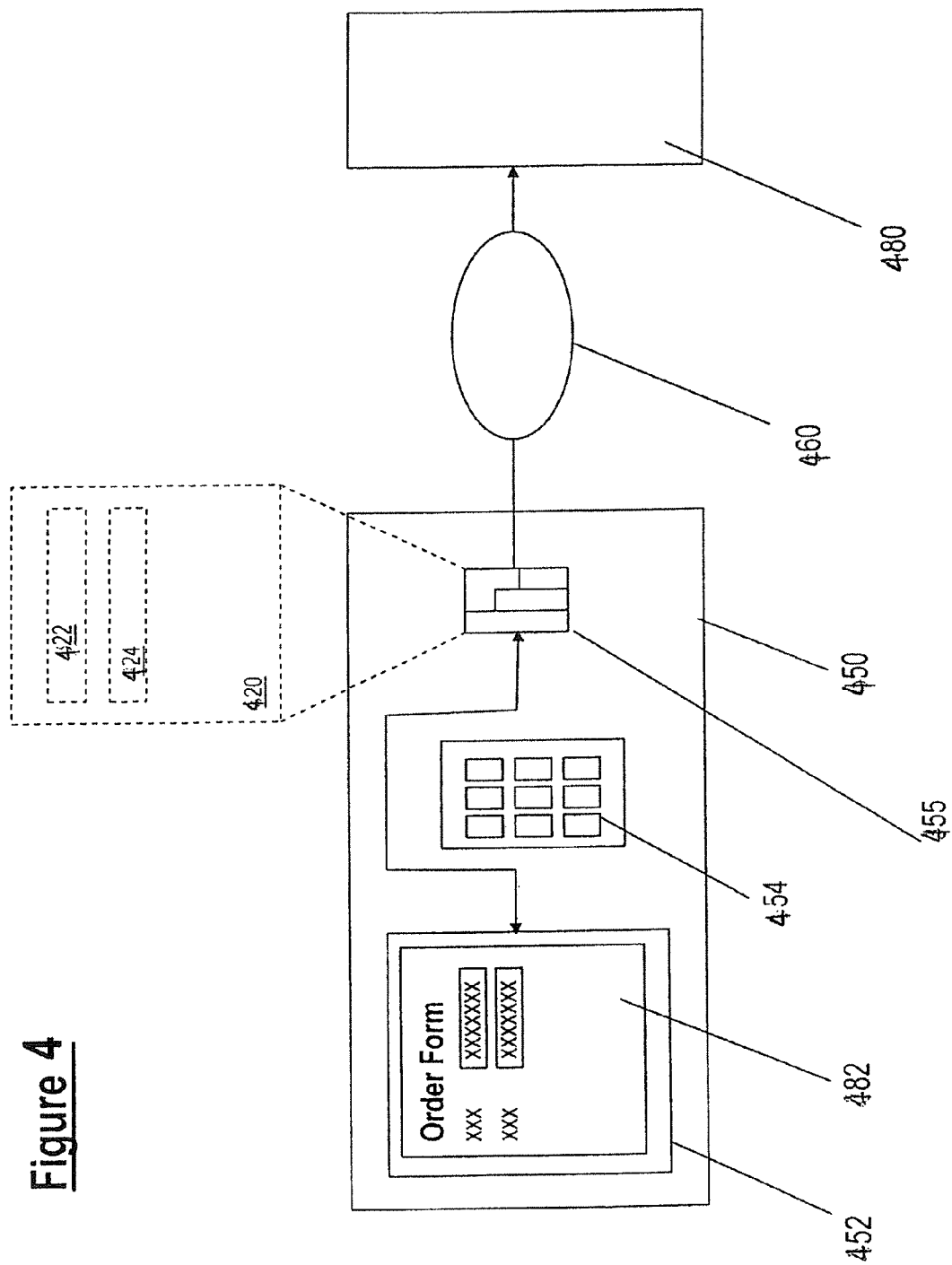
FIG. 4 is a schematic illustrating a system for secure financial transactions by a mobile telephone over a telephone network.

The preceding embodiments provide for the issuing bank of a payment card to 'notarize' a user's possession of a payment card number as part of the personalization process for their own smart payment cards, by way of the Public Key Certificate. In alternative embodiments, other types of organization can notarize such possession by way of a Public Key Certificate issued in association with an alternative type of Private Key storage device to effect secure financial transactions in accordance with the present invention. For instance, the embodiment of FIG. 4 exploits an established billing relationship between a telephone company and a given customer, in which the customer's payment card details are known to the telephone company. In this already common scenario, the present invention can be applied as in the embodiment of FIG. 4. A Certificate Authority (not shown) operated by or on behalf of the telephone company (not shown) issues a Public Key Certificate 420. The Public Key Certificate 320 includes the user's payment card number 422, thus identifying the payment card. The Public Key Certificate 420 also includes a digital signature 424 of the telephone company. The Public Key Certificate 420 is associated with a Private Key held on a SIM card 455 of a mobile (cellular) telephone 450. The mobile telephone may then communicate via a mobile telephone network 460 with a merchant server 480. The merchant server 480 serves a web commerce form 482 suitable for display on the telephone display 452. The user may use the keypad 454 of the telephone 450 to enter the PIN for the SIM 455, which then uses the securely stored Private Key to sign the transaction details which are communicated to the merchant server 480 via network 460. The merchant server 480 may then authenticate the transaction in a similar manner as set out in the first embodiment above. Such an embodiment therefore provides a mobile phone subscriber with the means to present their payment card details securely in a "mobile commerce" transaction.

Figure 5:
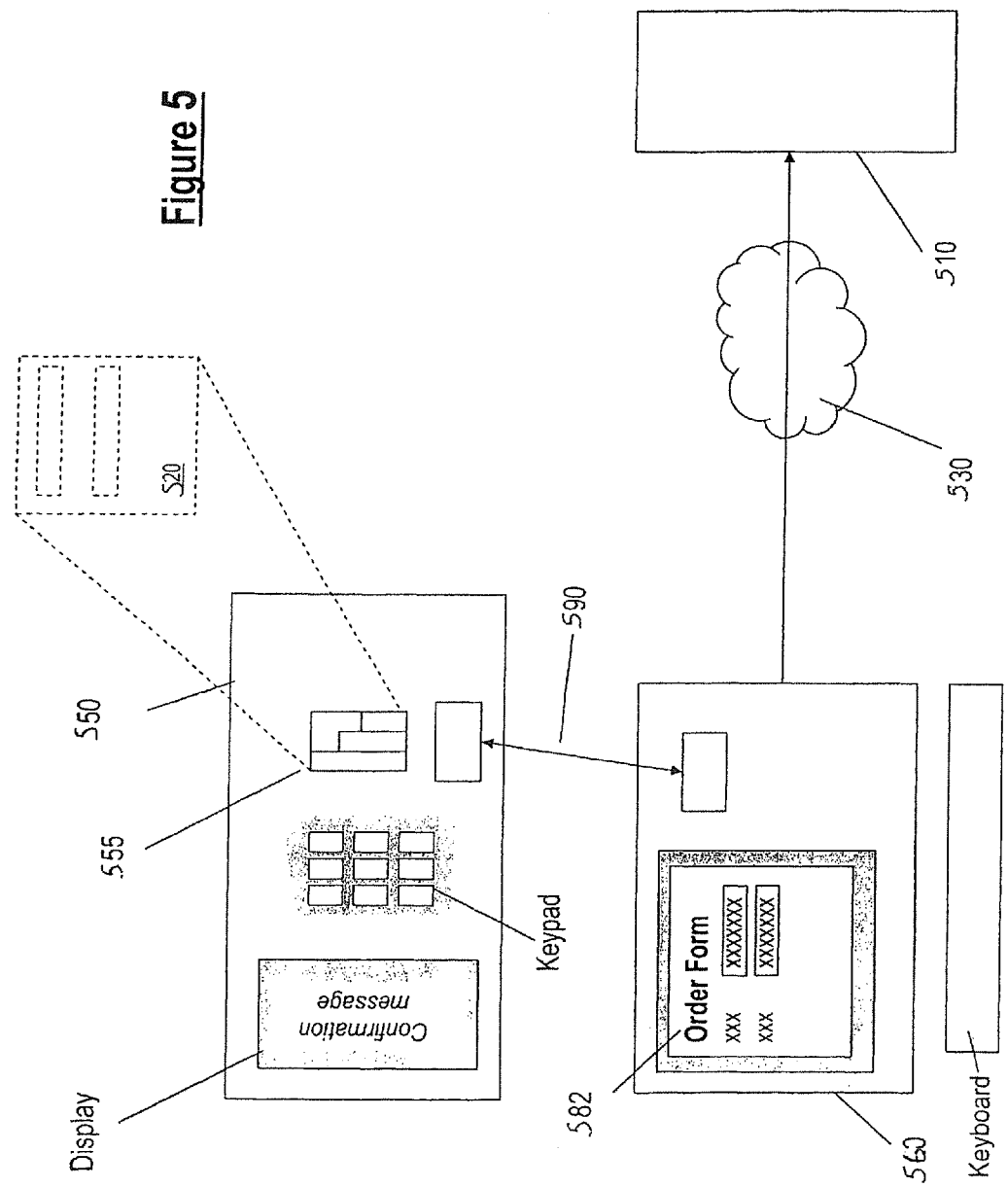
FIG. 5 is a schematic illustrating a system for secure financial transactions over the Internet with a Bluetooth connection between a user's personal computer and mobile telephone.

FIG. 5 illustrates another embodiment in which a SIM card 555 of a mobile telephone 550 is utilized to convey the Public Key Certificate 520 that identifies the user's payment card and signed data items to a personal computer 560 over a Bluetooth communications channel 590 or similar. The Private Key associated with the Public Key Certificate 520 that identifies the user's payment card is securely stored within the SIM 555 which is only accessible by use of a PIN. The personal computer sends data items to the mobile phone 550 via link 590 for signing. The SIM 555 uses the Private Key to sign such data items and returns the signed data item to the personal computer 560 via link 590. A transaction is carried out between the personal computer 560 and a merchant server 510 via the Internet 530 using web form 582. That is, the mobile phone handset 550 and SIM 555 take the place of a smartcard connected to a reader on the personal computer as disclosed in the first embodiment of FIGS. 1 and 2. In alternative embodiments any suitable Bluetooth or similar device providing tamper resistant secure storage of the Private Key may be used for such arrangements.

Figure 6:
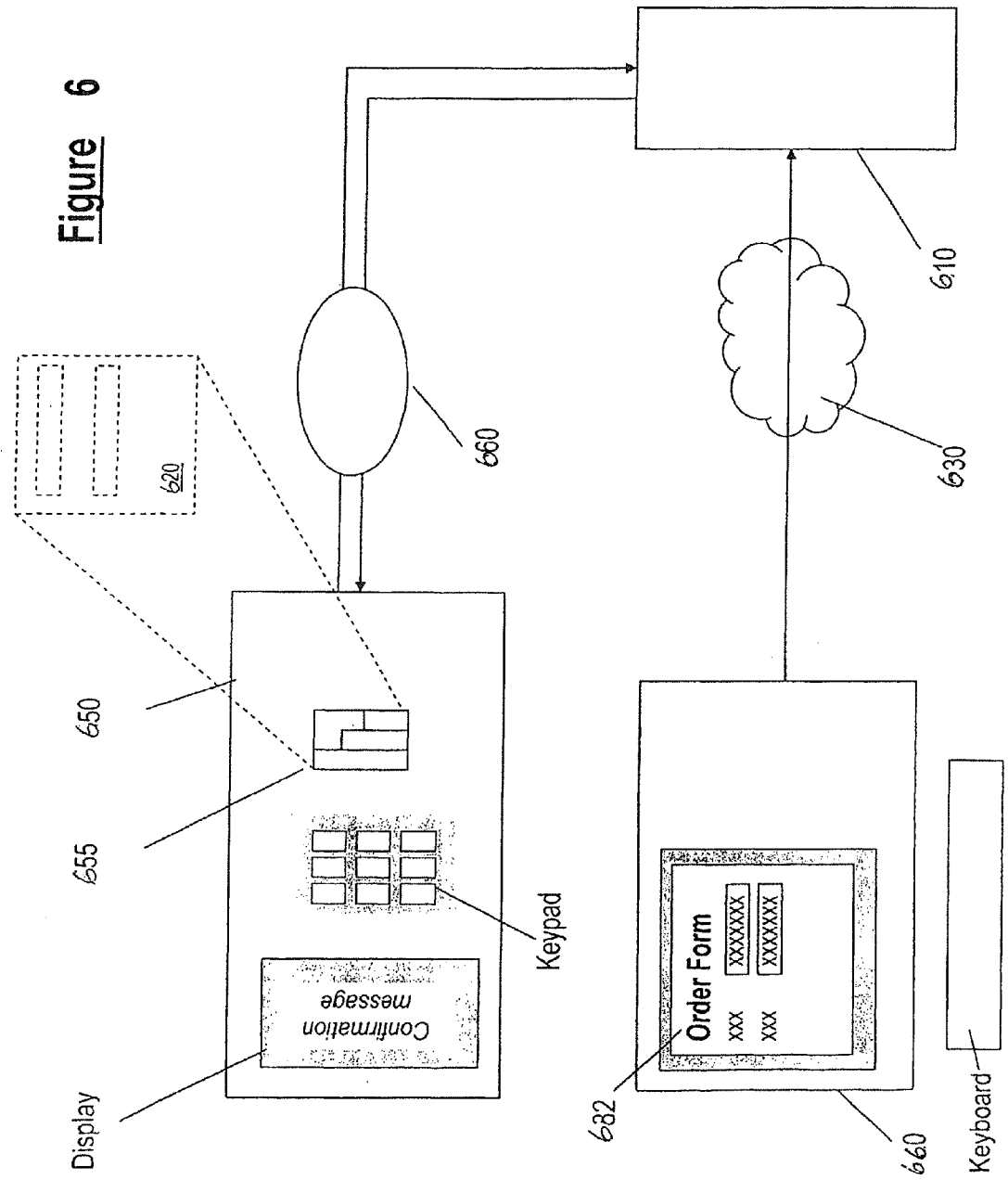
FIG. 6 is a schematic illustrating a system for financial transactions over the Internet secured via authentication messages sent over the telephone network.

FIG. 6 illustrates another embodiment utilizing a mobile phone 650 SIM card 655 to convey the Public Key Certificate 620 holding payment card details, the exchange of authenticating data with the processing chip 655 and signing of said data by the chip 655 is carried out over the mobile telephone network 660 rather than directly between the personal computer 660 and the phone 650. That is, the personal computer 660 is used to complete the web commerce form which is returned to the merchant server 610 via the internet 630. A method such as Wireless Public Key Infrastructure (WPKI) provides an appropriate means for the present invention to effect the secure presentation of payment card details held in a Public Key Certificate 620 associated with a SIM 655. The merchant server 610 thus sends a WPKI data message to the telephone 650 for confirmation by the customer, which is effected by the customer entering their PIN which enables the SIM 655 to digitally sign the WPKI data message and return the signed message to the merchant server 610 via the telephone network 660.

It will be appreciated by persons skilled in the art that numerous variations and/or modifications may be made to the invention as described in the specific embodiments disclosed herein, without departing from the spirit or scope of the invention as broadly described. For example, it will be appreciated by persons skilled in the art of Public Key Infrastructure that there are numerous methods and processes available for generating Public Key-Private Key pairs, generating Public Key Certificates, and personalizing and issuing cryptographic storage devices, and any suitable such method may be adopted in implementing the present invention.

While the embodiment described herein involves cryptographic storage devices and Public Key Certificates being issued by a financial institution or telephone company, alternative embodiments can make use of outsourced managed service providers that issue storage devices and Public Key Certificates on behalf of the institution, under contract to the institution.

Still further, while the preferred embodiment has been described with reference to a personal computer and/or mobile telephone for accessing online resources, it is to be appreciated that any computing device with network connectivity may be used in implementing the present invention. For example the computing device may comprise a suitably configured "multimedia" mobile telephone, personal assistant or the like.

Some portions of this detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is described in the foregoing context, it is not meant to be limiting as those of skill in the art will appreciate that various of the acts and operations described may also be implemented in hardware.

It should be borne in mind, however, that all of these and similar terms are to be associated with the appropriate physical quantities and are merely convenient labels applied to these quantities. Unless specifically stated otherwise as apparent from the description, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Figure 7:
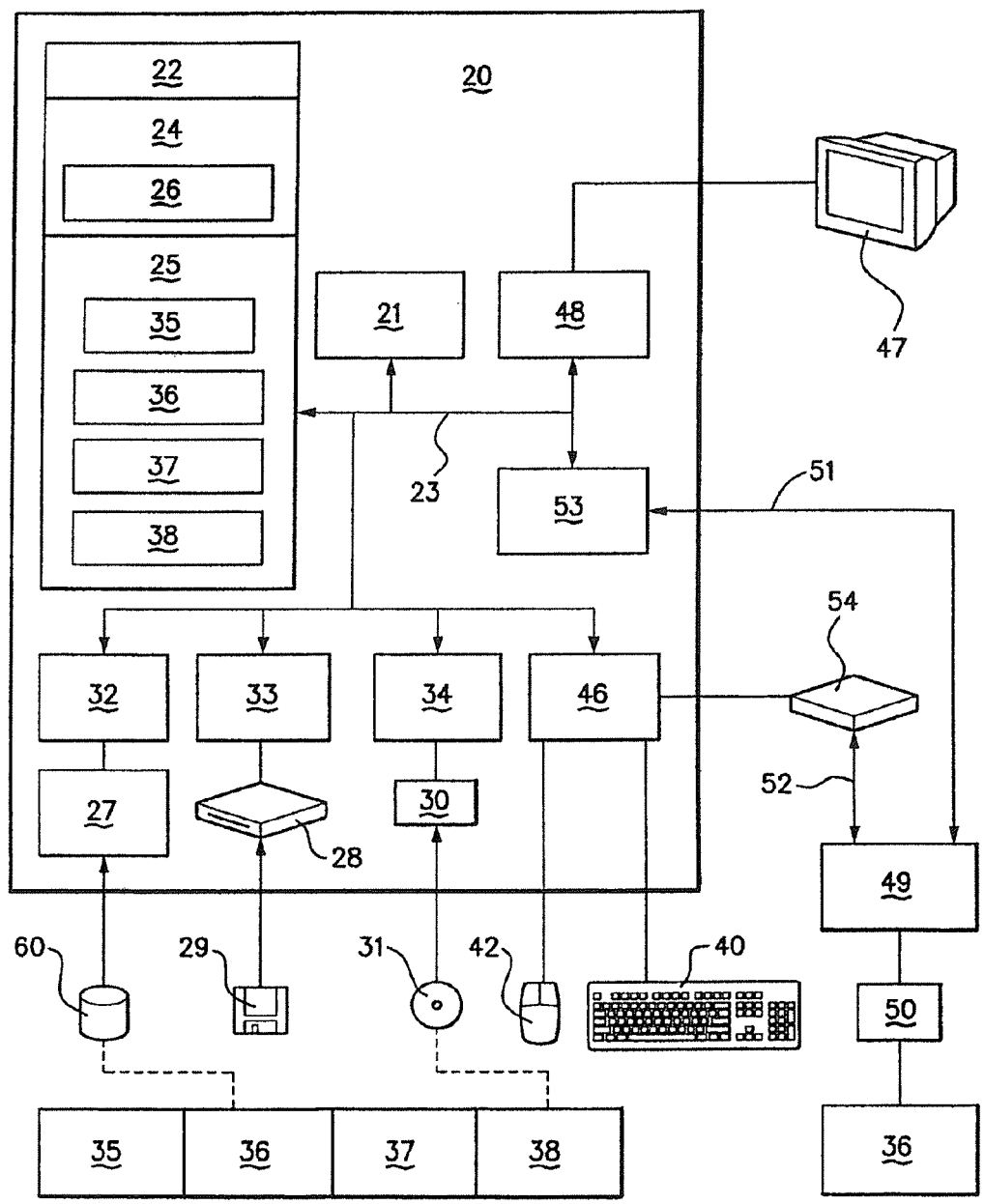
FIG. 7 illustrates a general-purpose computing device that may be used in an exemplary system for implementing the invention.

Turning to FIG. 7, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

In FIG. 7 a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment shown employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated. The logical connections depicted include a local area network (LAN) 51 and a wide area network (WAN) 52. Such networking environments are commonplace in offices, enterprise-wide computer networks, intranets and, inter alia, the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

It will be appreciated by persons skilled in the art that numerous variations and/or modifications may be made to the invention as shown in the specific embodiments without departing from the scope of the invention as broadly described. The present embodiments are, therefore, to be considered in all respects as illustrative and not restrictive.

What is claimed is:

1. A method for securing a financial transaction in an unsecured electronic communications environment, the method comprising:

securely storing in a storage device of a user a cryptographic Private Key; and creating a Public Key Certificate corresponding to said Private Key, the Public Key Certificate identifying personal financial information of the user, and the Public Key Certificate being signed by or on behalf of an organization attesting to the personal financial information;

wherein at a time of initiating a financial transaction between the user and a relying party, a data item associated with said financial transaction is signed using the Private Key, and the signed data item is conveyed to the relying party via the unsecured electronic communications environment, and the signed data item and the Public Key Certificate are used by the relying party to evince that the financial transaction was agreed to by the user.

2. The method as for claim 1, wherein the storage device is a mobile telephone.

3. The method as for claim 1, wherein the storage device is a SIM card.

4. The method as for claim 1 wherein the personal financial information comprises payment card information of the user.

5. The method as for claim 1 wherein the personal financial information comprises personal information of the user other than payment card information.

6. The method as for claim 1, further comprising:

the signed data item and the Public Key Certificate being used by the relying party to evince that the customer has conducted the financial transaction using a scheme-approved device; and determining from the signed data item and the Public Key Certificate a user's bona fides under the scheme without the organization performing any additional authentication handshake with the user or their storage device.

7. The method of claim 6, wherein the user's bona fides under the scheme are determined by the merchant and conveyed to the organization.

8. The method of claim 6, wherein the signed data item and the Public Key Certificate are communicated to the organization and the user's bona fides under the scheme are determined by the organization.

9. The method of claim 6, further comprising the signed data item and the Public Key Certificate being used by the relying party to evince an address of the organization's scheme server.

10. The method of claim 1 wherein the Public Key Certificate is conveyed from the storage device to the relying party together with the signed data item.

11. A user device for effecting secure financial transactions in an unsecured electronic communications environment, the device comprising:

a tamper resistant storage device securely storing a cryptographic Private Key;

wherein at a time of using the device to effect a financial transaction with a relying party, the Private Key is used to sign a data item associated with said transaction and the signed data item is conveyed to the relying party via the unsecured communications environment, and whereby the relying party uses a Public Key Certificate corresponding to said Private Key to authenticate the signed data item, the Public Key Certificate identifying personal financial information of the user and being signed by or on behalf of an organization attesting to the personal financial information.

12. A computer program element comprising computer program code means to make a customer computer execute a procedure for effecting secure financial transactions in an unsecured electronic communications environment, the computer program element comprising:

computer program code means for effecting communication with a relying party via the unsecured electronic communications environment in relation to a transaction;

computer program code means for causing a cryptographic Private Key securely stored in a storage device of a user to sign a data item associated with said transaction; and computer program code means for causing the signed data item to be conveyed to the relying party to effect the transaction, whereby the relying party uses a Public Key Certificate corresponding to said Private Key to authenticate the signed data item, the Public Key Certificate identifying personal financial information of the user and being signed by or on behalf of an organization attesting to the personal financial information.

13. A computer program element comprising computer program code means to make a merchant computer execute a procedure for effecting secure financial transactions in an unsecured electronic communications environment, the computer program element comprising:

computer program code means for effecting communication with a customer via the unsecured electronic communications environment in relation to a transaction;

computer program code means for receiving a Public Key Certificate identifying personal financial information of the customer, and for authenticating that the Public Key Certificate has been signed by or on behalf of an organization attesting to the personal financial information; and computer program code means for using a Public Key contained in the Public Key Certificate to authenticate that a signed data item associated with said transaction was signed by a Private Key associated with the Public Key Certificate, and for making completion of the transaction conditional upon such authentication.

\* \* \* \* \*